(12) United States Patent
Youn et al.

(10) Patent No.: US 10,520,354 B2
(45) Date of Patent: Dec. 31, 2019

(54) APPARATUS AND METHOD FOR DIAGNOSING ROTOR SHAFT

(71) Applicant: SEOUL NATIONAL UNIVERSITY R&DB FOUNDATION, Seoul (KR)

(72) Inventors: Byeng Dong Youn, Seoul (KR); Byung Chul Jeon, Seoul (KR); Joon Ha Jung, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 292 days.

(21) Appl. No.: 15/239,987

(22) Filed: Aug. 18, 2016

(65) Prior Publication Data

US 2017/0160125 A1 Jun. 8, 2017

(30) Foreign Application Priority Data

Dec. 4, 2015 (KR) .................. 10-2015-0172699

(51) Int. Cl.
*G01H 1/00* (2006.01)

(52) U.S. Cl.
CPC .................. *G01H 1/006* (2013.01)

(58) Field of Classification Search
None
See application file for complete search history.

(56) References Cited

U.S. PATENT DOCUMENTS

| | | |
|---|---|---|
| 5,544,073 A | 8/1996 | Piety et al. |
| 2006/0113867 A1* | 6/2006 | Sakatani ............... G02B 7/023 310/323.17 |
| 2012/0038247 A1* | 2/2012 | Sakamoto ............ H02N 2/103 310/323.16 |
| 2012/0189443 A1* | 7/2012 | Esbensen .............. F03D 7/00 416/1 |

(Continued)

FOREIGN PATENT DOCUMENTS

| | | |
|---|---|---|
| KR | 10-1997-0010252 B1 | 6/1997 |
| KR | 10-2009-0102057 A | 9/2009 |

OTHER PUBLICATIONS

Nicolas Peton, XIIIth International Scientific and Engineering Conference "HERVICON-2011" Balancing With the Presence of a Rub, pp. 182-191, 2011 Published by Elsevier Ltd. Selection.*

(Continued)

*Primary Examiner* — Tung S Lau
(74) *Attorney, Agent, or Firm* — Korus Patent, LLC; Seong Il Jeong

(57) ABSTRACT

An apparatus and method for diagnosing rotor shaft are disclosed herein. The apparatus for diagnosing a rotor shaft that is installed in a bearing so that the rotor shaft is rotated around an axis of rotation includes a measurement unit, a calculation unit, an image generation unit, and a diagnosis unit. The measurement unit measures first vibration signals at two points of the rotor shaft located on a surface perpendicular to the axis of rotation. The calculation unit generates second vibration signals, which are vibration signals at (Continued)

points located in a plane identical to the plane of the two points of the rotor shaft at which the first vibration signals are measured, based on the first vibration signals. The image generation unit generates an image based on the second vibration signals. The diagnosis unit diagnoses the rotor shaft based on the generated image.

8 Claims, 8 Drawing Sheets

(56) References Cited

U.S. PATENT DOCUMENTS

2017/0173262 A1* 6/2017 Veltz .................. A61M 5/1723

OTHER PUBLICATIONS

S.Y. Yoon et al., Control of Surge in Centrifugal Compressors by Active Magnetic Bearings, Advances in Industrial Control, © Springer-Verlag London 2013, p. 17-55.*
Diconary.com, define different, Feb. 22, 2019 , 1 page.*
Diconary.com, define identical, Feb. 22, 2019 , 1 page.*
Gaston Desimone, Machinery Diagnostic Plots—Part 2, 27 pages, 2018.*
Measurement Types in Machinery Monitoring, Dec. 2017, 18 pages.*
Won-Chul Jang and Jong-Myon Kim, Bearing Multi-Faults Detection of an Induction Motor using Acoustic Emission Signals and Texture Analysis, Journal of the Korea Society of Computer and Information, vol. 19, No. 4, Apr. 2014.

* cited by examiner

APPARATUS AND METHOD FOR DIAGNOSING ROTOR SHAFT

CROSS-REFERENCE TO RELATED APPLICATION

This application claims the benefit of Korean Patent Application No. 10-2015-0172699 filed on Dec. 24, 2015, which is hereby incorporated by reference herein in its entirety.

BACKGROUND

1. Technical Field

The present invention relates generally to an apparatus and method for diagnosing a rotor shaft. More particularly, the present invention relates to an apparatus and method that diagnose a rotor shaft based on an image that is generated based on the vibration data of the rotor shaft.

2. Description of the Related Art

Various types of rotor shaft, such as blades, motors, etc., are installed in large-sized facilities, such as a power plant, a general plant, etc. Such a rotor shaft continuously undergoes rotation movement while facilities are being operated, and thus has the possibility of being damaged or failing. Accordingly, periodic inspection and repair are required.

Conventionally, in order to perform the real-time monitoring and diagnosis of such a rotor shaft, signals regarding the detection of the characteristics of the rotor shaft is collected using physical sensors capable of analyzing the vibration characteristics, temperature characteristics, pressure characteristics and rotating torque characteristics of the rotor shaft, the movement trajectory characteristics of an axis of rotation, etc., and then the rotor shaft is diagnosed based on the collected signals.

A conventional patent regarding such a technology for inspecting a rotor shaft is disclosed in Korean Patent No. 10-1265224.

However, the conventional method is problematic in that a person having ordinary knowledge in the art cannot intuitively determine whether a rotor shaft is in abnormal condition and the conventional method cannot detect a case where an abnormal condition having specific directionality has occurred in a rotor shaft.

Accordingly, recently, there is a demand for an apparatus and method that can intuitively determine whether a rotor shaft is in abnormal condition and that can detect a case where an abnormal condition having specific directionality has occurred in a rotor shaft.

Meanwhile, the above-described background technology corresponds to technical information that has been possessed by the present inventor in order to devise the present invention or that has been acquired in the process of devising the present invention, and cannot be necessarily considered to be well-known technology that had been known to the public before the filing date of the present invention.

SUMMARY

At least some embodiments of the present invention are directed to the provision of an apparatus and method for diagnosing a rotor shaft.

In accordance with an aspect of the present invention, there is provided an apparatus for diagnosing a rotor shaft that is supported by bearings so that the rotor shaft is rotated around an axis of rotation, the apparatus including: a measurement unit configured to measure first vibration signals at two points of the rotor shaft located on a surface perpendicular to the axis of rotation; a calculation unit configured to generate second vibration signals, which are vibration signals at points located in a plane identical to the plane of the two points of the rotor shaft at which the first vibration signals are measured, based on the first vibration signals; an image generation unit configured to generate an image based on the second vibration signals; and a diagnosis unit configured to diagnose the rotor shaft based on the generated image.

In accordance with another aspect of the present invention, there is provided a method of diagnosing rotor shaft, installed in a bearing so that the rotor shaft is rotated around an axis of rotation, using an apparatus for diagnosing a rotor shaft, the method including: measuring first vibration signals at two points of the rotor shaft located on a surface perpendicular to the axis of rotation; calculating second vibration signals, which are vibration signals at points located in a plane identical to the plane of the two points of the rotor shaft at which the first vibration signals are measured, based on the first vibration signals; generating an image based on the second vibration signals; and diagnosing the rotor shaft based on the generated image.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
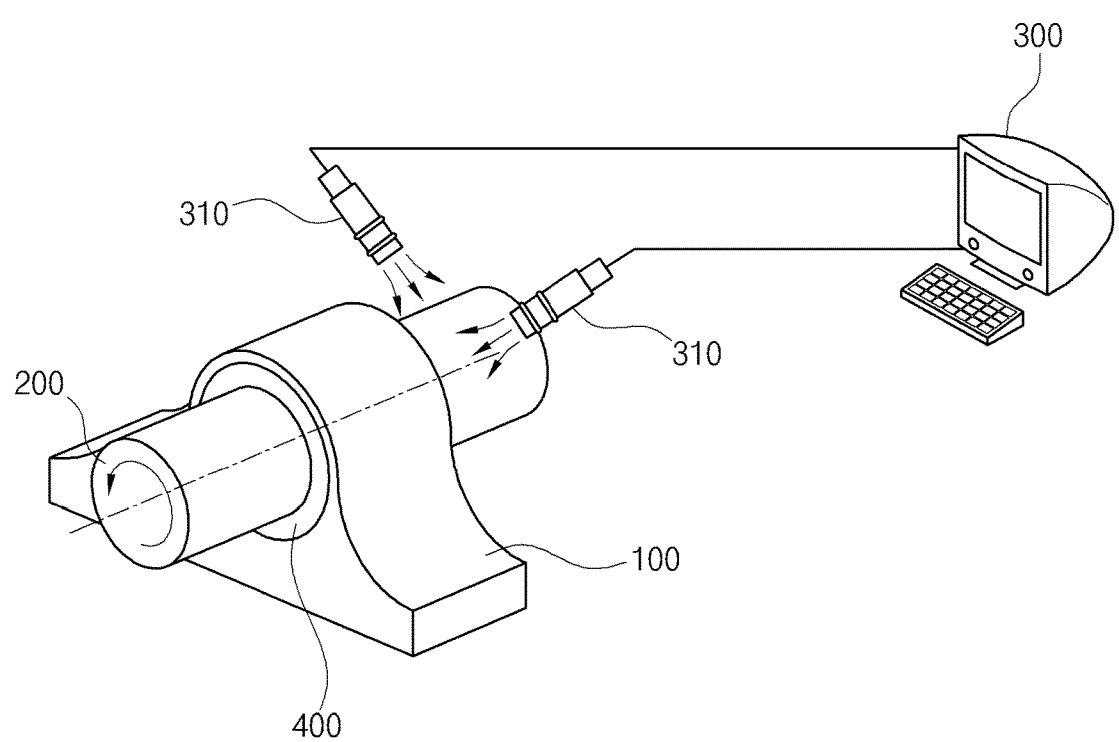
FIG. 1 is a diagram showing a state in which an apparatus for diagnosing a rotor shaft according to an embodiment of the present invention is used.

In the following description, embodiments of the present invention will be described in detail with reference to the accompanying drawings so that those having ordinary knowledge in the art to which the present invention pertains can easily practice the present invention. However, the present invention may be implemented in various different forms, and are not limited to the embodiments described herein. Furthermore, portions unrelated to descriptions are omitted in the drawings in order to clearly describe the present invention, and the same or similar reference symbols are assigned to the same or similar components throughout the specification.

Throughout the specification and the claims, when a portion or component is described as being connected to another portion or component, this includes not only a case where they are directly connected to each other but also a case where they are electrically connected to each other with a third portion or component interposed therebetween. Furthermore, when a portion or component is described as including another portion or component, this means that a third portion or component is not excluded from the first portion or component but may be included in the first portion or component, unless particularly described to the contrary.

Embodiments of the present invention are described in detail with reference to the accompanying drawings.

First, an apparatus 300 for diagnosing a rotor shaft 200 according to an embodiment of the present invention is described with reference to FIGS. 1 to 10.

Figure 2:
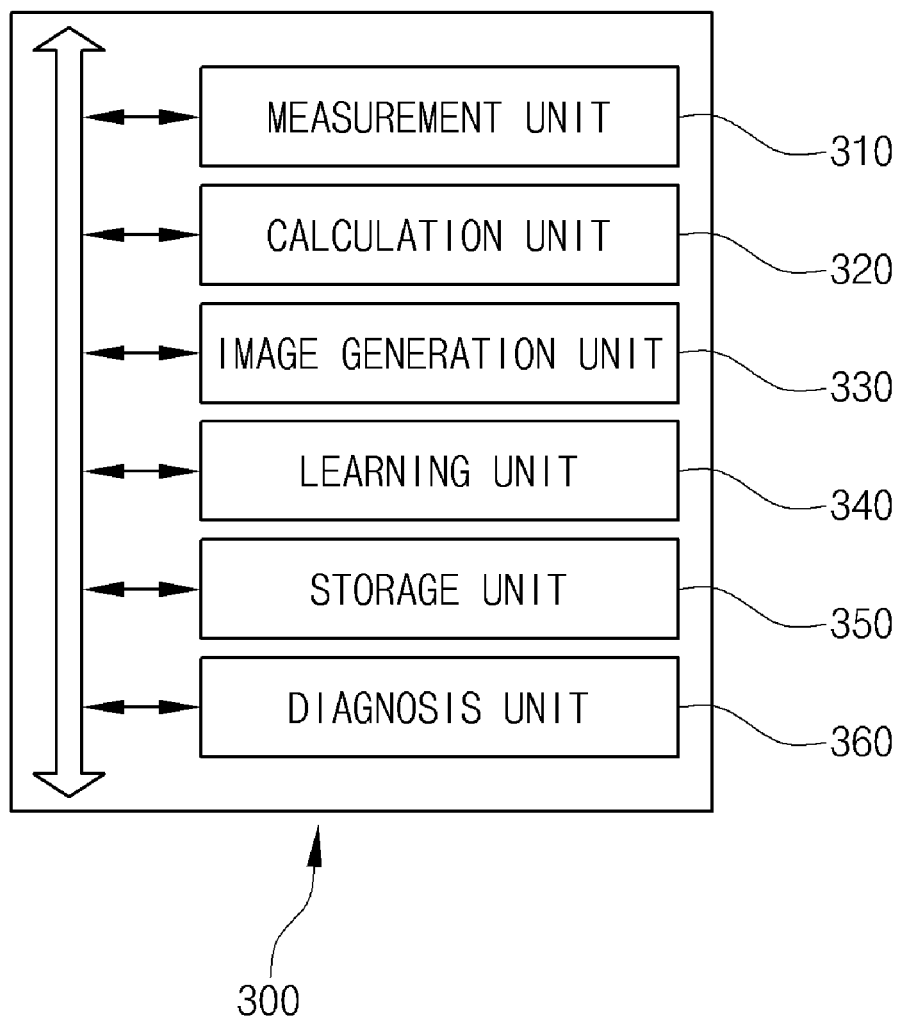
FIG. 2 is a block diagram showing the configuration of the apparatus for diagnosing a rotor shaft according to the embodiment of the present invention.

FIG. 1 is a diagram showing a state in which the apparatus 300 for diagnosing a rotor shaft 200 according to the embodiment of the present invention is used, and FIG. 2 is a block diagram showing the configuration of the apparatus 300 for diagnosing a rotor shaft 200 according to the embodiment of the present invention.

The apparatus 300 for diagnosing a rotor shaft 200 according to the embodiment of the present invention is an apparatus for diagnosing whether a rotor shaft 200 that is installed in a bearing 100 so that the rotor shaft 200 can be rotated around an axis of rotation in a predetermined direction is abnormal. In this case, the bearing 100 is configured to fasten the rotor shaft 200 at a predetermined location and to support the rotor shaft 200. Furthermore, the rotor shaft 200 according to an embodiment of the present invention is rotated by force that is applied to the rotor shaft 200. Oil 400 functioning to reduce friction resulting from the rotation of the rotor shaft 200 may be disposed between the rotor shaft 200 and the bearing 100.

The apparatus 300 for diagnosing a rotor shaft 200 according to an embodiment of the present invention may further include a measurement unit 310 configured to measure vibration signals at predetermined points of the rotor shaft 200.

While an ideal rotor shaft 200 is rotated around an axis of rotation without vibration, the actual rotor shaft 200 is rotated while vibrating due to the eccentricity of weight in a specific direction or the like. The measurement unit 310 detects and measures vibration signals, generated by the rotation of the rotor shaft 200, at the predetermined points.

According to an embodiment of the present invention, the measurement unit 310 may measure vibration signals at two respective points located on surfaces that are perpendicular to the axis of rotation. In the following, the measured vibration signals are referred to as "first vibration signals." Furthermore, the two points may be spaced apart from each other perpendicularly around the axis of rotation. That is, the angle that a first point at which a first vibration signal is measured and a second point, i.e., the other point at which the other first vibration signal is measured, form with respect to the axis of rotation may be a right angle.

Figure 3:
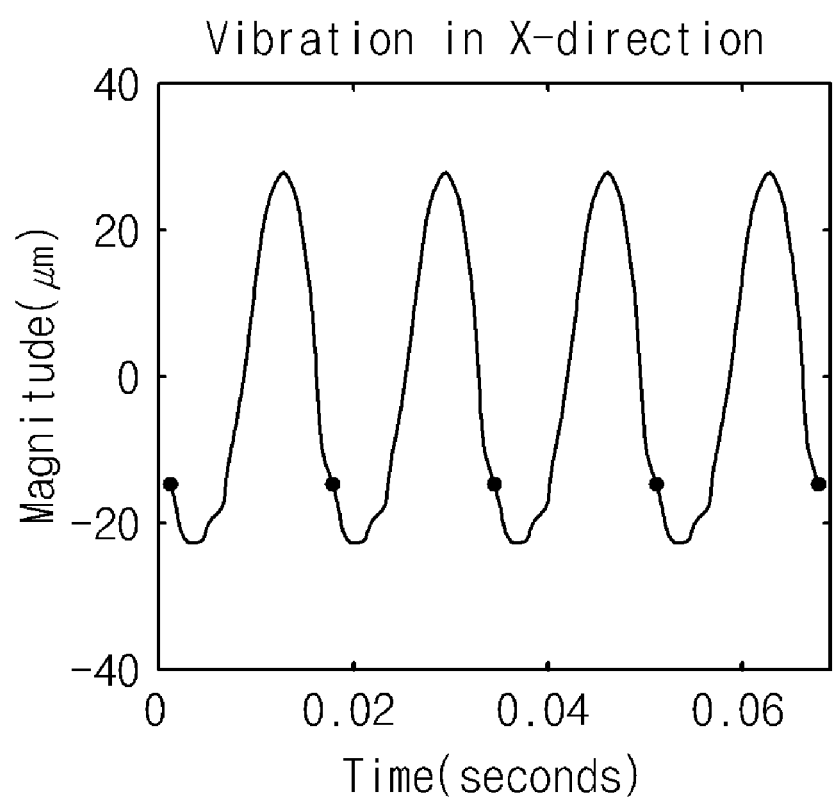
FIGS. 3 and 4 are graphs showing examples of first vibration signals.
Figure 4:
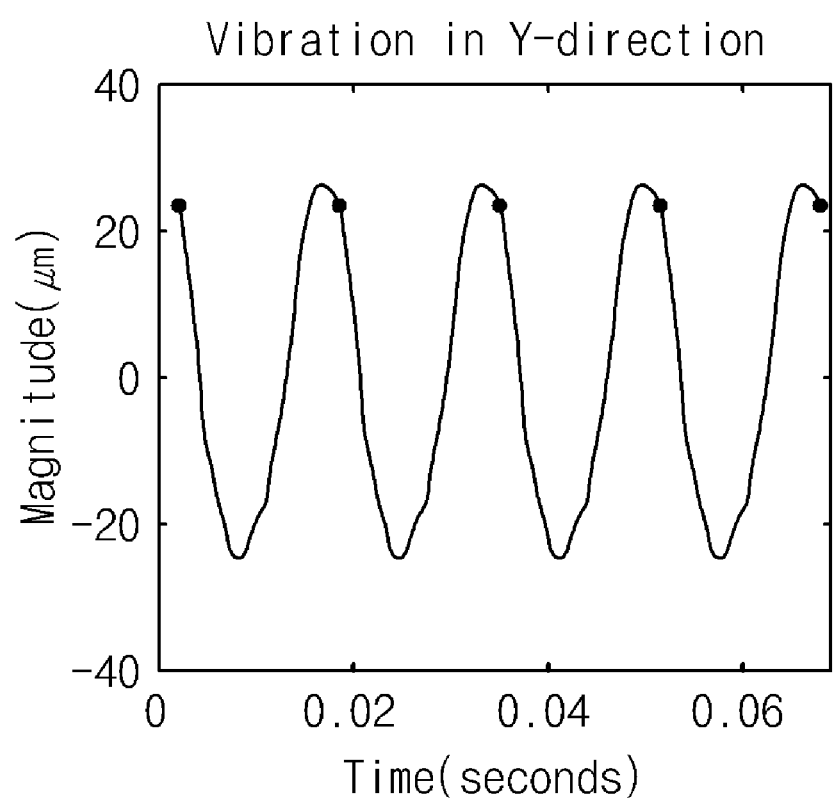

FIGS. 3 and 4 are graphs showing examples of the first vibration signals.

In particular, in FIG. 3, when the direction from the axis of rotation to the first point is an X direction, a vibration signal that is generated in the X direction is illustrated.

Furthermore, in FIG. 4, when the direction from the axis of rotation to the second point is a Y direction, a vibration signal that is generated in the Y direction is illustrated. According to an embodiment of the present invention, the X direction and the Y direction may be perpendicular to each other.

The configuration of the apparatus 300 for diagnosing a rotor shaft 200 is further described.

The apparatus 300 for diagnosing a rotor shaft 200 according to an embodiment of the present invention may further include a calculation unit 320 configured to generate a second vibration signal based on each of the measured first vibration signals.

The calculation unit 320 according to an embodiment of the present invention may be located in a plane identical to the plane of the first and second points, and may generate second vibration signals based on the first vibration signals, i.e., vibration signals at specific points on the rotor shaft 200. In particular, the calculation unit 320 may generate vibration signals at respective points that have been rotated from any one point, at which a first vibration signal has been measured, around the axis of rotation by a predetermined angle of rotation one or more times, as second vibration signals.

The calculation unit 320 according to an embodiment of the present invention may generate the second vibration signals based on Equation 1 below:

$$x_n = \cos(n\Delta\theta)x_0 - \sin(n\Delta\theta)y_0 (n=1,2,\ldots,N) \tag{1}$$

where $\Delta\theta$ is an angle of rotation, $x_0$ and $y_0$ are the first vibration signals, and $x_n$ is a second vibration signal at a point that has been rotated from $x_0$ by $\Delta\theta$ n times.

Figure 5:
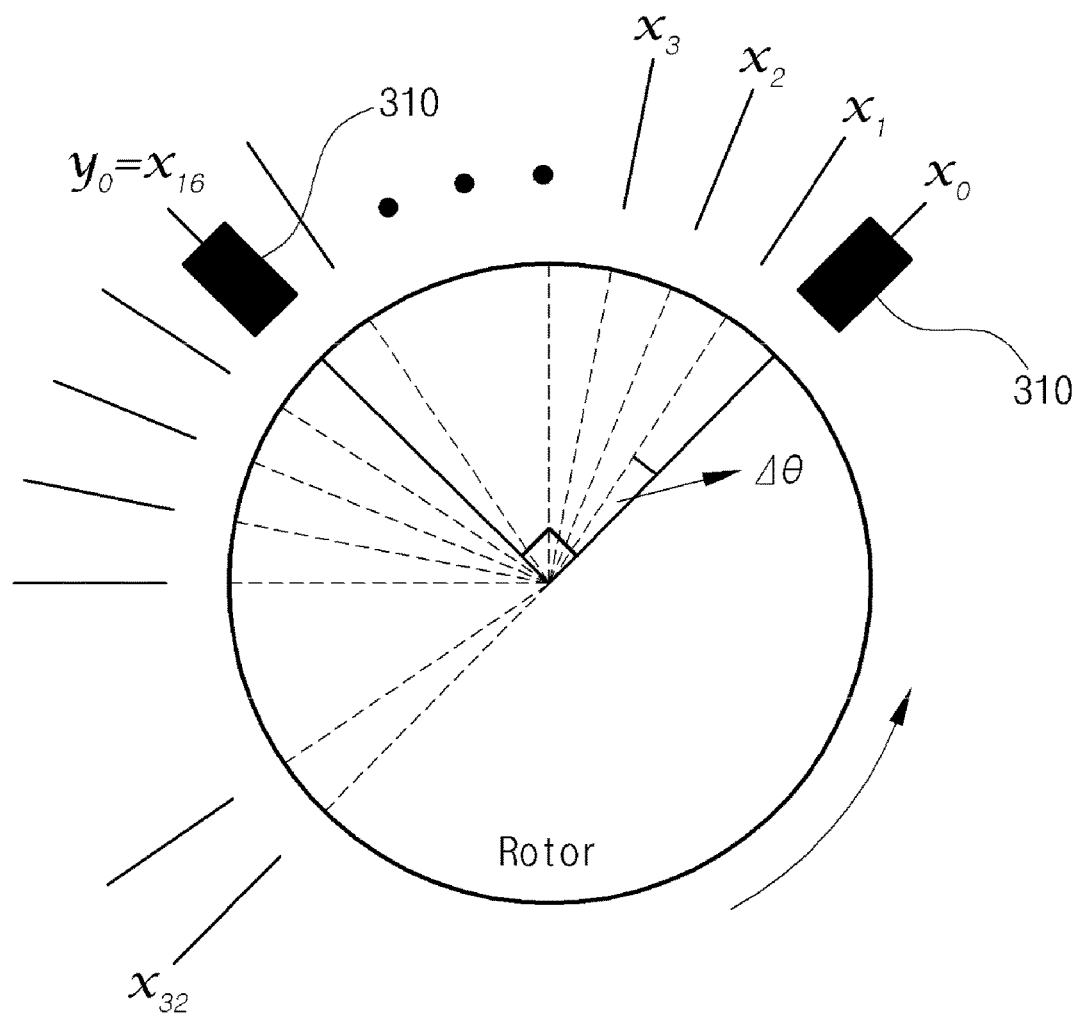
FIG. 5 is a diagram showing the cross section of a rotor shaft according to an embodiment of the present invention.

FIG. 5 is a diagram showing the cross section of the rotor shaft 200 according to an embodiment of the present invention. In particular, FIG. 5 is a diagram showing the cross section of the rotor shaft 200 that is perpendicular to the axis of rotation.

Referring to FIG. 5, the operation of the calculation unit 320 is described. When $x_0$ and $y_0$ are the first vibration signals and the point at which $x_0$ is obtained, i.e., the first point, is set as a reference, the calculation unit 320 may generate a vibration signal at a point that has been rotated from the first point by $\Delta\theta$, as a second vibration signal $x_1$. Furthermore, the calculation unit 320 may successively generate a vibration signal at a point that has been rotated from the point at which the second vibration signal $x_1$ has been generated by $\Delta\theta$, as a second vibration signal $x_2$. In this manner, the calculation unit 320 may generate second vibration signals up to $x_n$.

According to an embodiment of the present invention, the calculation unit 320 may generate second vibration signals only at points within a range corresponding to a half of a total range from a predetermined point, i.e., a range corresponding to a semicircle of a surface perpendicular to the axis of rotation. Since the rotor shaft 200 undergoes rotation movement, second vibration signals at points within a range corresponding to the remaining semicircle may be the same as generated second vibration signals. The reason for this is that the second vibration signals at the points within the range corresponding to the remaining semicircle have opposite phases of the same size compared to signals at symmetrical points with respect to the center of an axis. Accordingly, the second vibration signals in the remaining semicircle may be inferred from the generated second vibration signals in the semicircle.

FIG. 5 shows second vibration signals that are generated only within a range corresponding to a semicircle.

The apparatus 300 for diagnosing a rotor shaft 200 according to an embodiment of the present invention may further include an image generation unit 330 configured to generate an image based on second vibration signals.

The image generation unit 330 according to an embodiment of the present invention may generate an image in which time plotted on an axis and the values of second vibration signals at respective points, sequentially generated from any one point at which a first vibration signal is measured, plotted on another axis are associated with each other. Furthermore, the image generation unit 330 may generate an image in which brightness varies in proportion to the value of a corresponding second vibration signal. For example, the image generation unit 330 may generate an image in which the brightness of a corresponding pair of coordinates is higher when the value of a corresponding second vibration signal value is larger and the brightness of a corresponding pair of coordinates is lower when the value of a corresponding second vibration signal is smaller. Alternatively, the image generation unit 330 may generate an image in which the brightness of a corresponding pair of coordinates is higher when the value of a corresponding second vibration signal value is smaller and the brightness of a corresponding pair of coordinates is lower when the value of a corresponding second vibration signal is larger.

In this case, in order to achieve consistent image generation, the image generation unit 330 may generate an image using result values after generated second vibration signals have undergone preprocessing and phase synchronization processes. In this case, the preprocessing process may be the process of resampling second vibration signals or eliminating noise from second vibration signals using a low-pass filter.

Figure 6:
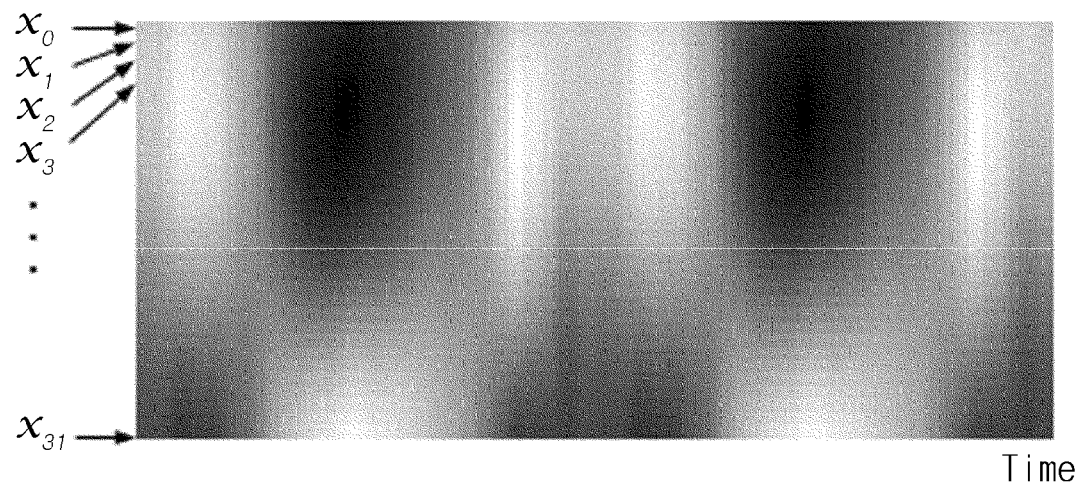
FIG. 6 is a view showing an image that is generated by an image generation unit according to an embodiment of the present invention.

FIG. 6 is a view showing an image that is generated by the image generation unit 330 according to an embodiment of the present invention.

As shown in FIG. 6, the image generation unit 330 may generate an image in which time plotted on an axis and the values of second vibration signals at respective points, sequentially generated from any one point at which a first vibration signal is measured, plotted on another axis are associated with each other. In particular, FIG. 6 shows an image in which a Y axis is associated with sequentially generated second vibration signals and the brightness of each pair of coordinates varies according to the value of a corresponding second vibration signal. In particular, FIG. 6 shows an image in which a Y axis is downwardly and sequentially associated with $x_0$ and $x_0$.

The configuration of the apparatus 300 for diagnosing a rotor shaft 200 according to an embodiment of the present invention is further described.

The configuration of the apparatus 300 for diagnosing a rotor shaft 200 according to an embodiment of the present invention may further include a learning unit 340 configured to classify a generated image and to learn the state of the rotor shaft 200 based on the classified image.

The learning unit 340 according to an embodiment of the present invention may classify the image, generated by the image generation unit 330, according to similarity. For this purpose, a user may input a test signal to the apparatus 300 for diagnosing a rotor shaft 200. When the generation unit 330 generates a test image based on the input test signal, the image learning unit 340 may classify the generated test image according to similarity.

The user may identify image characteristics, which are differently represented according to the state of the rotor shaft 200, by examining the classified data, i.e., the image. A diagnosis unit 360, which will be described later, may diagnose the rotor shaft 200 based on the results of the learning unit 340. More specifically, the rotor shaft 200 may be diagnosed by comparing an image, determined to be an image in a normal state as a result of the learning unit 340, with the image generated by the image generation unit 330.

According to another embodiment of the present invention, the learning unit 340 may classify a dissimilar image through comparison with a preset and stored normal image (an image when the rotor shaft 200 is normal), and then may reclassify the classified image according to similarity.

The learning unit 340 according to an embodiment of the present invention may learn the state of the rotor shaft 200 based on a deep learning method. In particular, the learning unit 340 may learn the state of the rotor shaft 200 using a Restricted Boltzmann Machine (RBM)-based deep learning method.

According to an embodiment of the present invention, the learning unit 340 may classify the test image generated based on the test input according to predetermined similarity, and then may select a representative image for each state. The selection of a representative image may be performed based on the selection of the user. Thereafter, the diagnosis unit 360 may diagnose the state of the rotor shaft 200 by determining similarity between the generated image and the representative image based on the rotation of the rotor shaft 200. More specifically, the diagnosis unit 360 may detect a representative image having predetermined or higher similarity to the generated image, and then may diagnose a state corresponding to the detected representative image as the current state of the rotor shaft 200.

According to an embodiment of the present invention, the apparatus 300 for diagnosing a rotor shaft 200 may perform the learning of the state of the rotor shaft 200 based on a test signal when there is no label for the learning data that is acquired by the learning unit 340. Thereafter, when the learning unit 340 acquires learning data, the apparatus 300 for diagnosing a rotor shaft 200 may diagnose the state of the rotor shaft 200 by driving the rotor shaft 200.

The apparatus 300 for diagnosing a rotor shaft 200 according to an embodiment of the present invention may further include a storage unit 350. The storage unit 350 may previously store a reference image that will be compared with the image that is generated by the image generation unit 330. Furthermore, data acquired or generated by the measurement unit 310 and the calculation unit 320 may be stored in the storage unit 350. Furthermore, various types of data input to and output from the apparatus 300 for diagnosing a rotor shaft 200 may be stored in the storage unit 350.

The apparatus 300 for diagnosing a rotor shaft 200 according to an embodiment of the present invention may further include a diagnosis unit 360 configured to diagnose the rotor shaft 200 based on the generated image.

The diagnosis unit 360 may diagnose the state of the rotor shaft 200 as an abnormal state if the preset and stored reference image and the generated image are determined to have different shapes by comparing them.

Furthermore, the diagnosis unit 360 may diagnose whether the state of a rotor shaft 200 is abnormal based on whether the generated image includes oblique lines or based on the shapes of oblique lines.

The abnormality of the rotor shaft 200 according to an embodiment of the present invention may include impact rubbing that is generated when the rotor shaft 200 collides with the bearing 100, mis-alignment that is generated because a plurality of rotor shaft 200 is not aligned when they are connected to each other, and an oil whirl that is generated due to the abnormality of the oil 400.

Images that are generated in the respective cases are described with reference to FIGS. 7 to 10 below.

Figure 7:
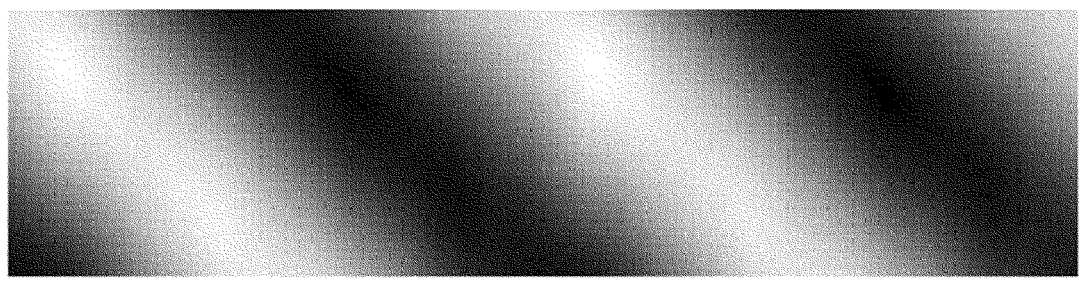
FIG. 7 is a view showing an image that is generated when a rotor shaft is normal.
Figure 8:
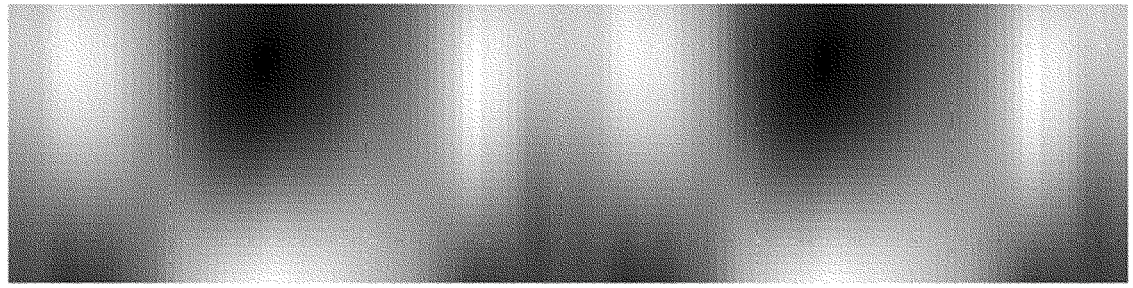
FIG. 8 is a view showing an image that is generated in the case of impact rubbing.
Figure 9:
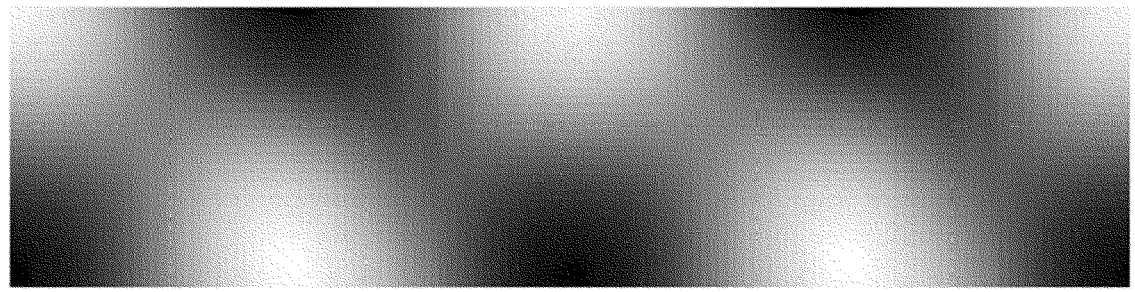
FIG. 9 is a view showing an image that is generated in the case of mis-alignment.
Figure 10:
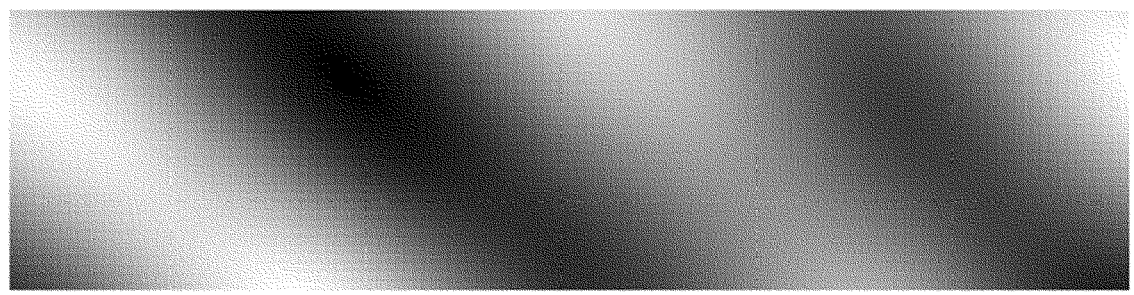
FIG. 10 is a view showing an image that is generated in the case of an oil whirl.

FIG. 7 is a view showing an image that is generated when the rotor shaft 200 is normal, FIG. 8 is a view showing an image that is generated in the case of impact rubbing, FIG. 9 is a view showing an image that is generated in the case of mis-alignment, and FIG. 10 is a view showing an image that is generated in the case of an oil whirl.

As shown in FIG. 7, an image that is generated when the rotor shaft 200 is normal includes oblique lines that are represented due to differences in the brightness of coordinates. In the cases of FIGS. 8 to 10, oblique lines are not included in an image, or the shapes of oblique lines are not clear.

As described above, even when the rotor shaft 200 is normal, the rotor shaft 200 is rotated in the state in which the weight of the rotor shaft 200 is biased toward any one side, i.e., the center of gravity is moved from the center of the rotor shaft 200, and thus vibration occurs. When the rotor shaft 200 is normal, such vibration is generated at predetermined periods while the rotor shaft 200 is being rotated. Furthermore, such periodic vibration is represented in each second vibration signal at predetermined periods and at predetermined values. When this is represented in the form of an image and the image generation unit 330 represents a higher second vibration signal using higher brightness at a corresponding pair of coordinates, a brighter range appears at predetermined intervals for each second vibration signal, as shown in FIG. 7. Furthermore, the vibration is sequentially transferred to points at which second vibration signals are generated, and thus the brighter range is moved obliquely in a downward direction along a Y axis. In this manner, brighter ranges are aggregated in the image, and thus oblique lines may be represented.

When the rotor shaft 200 is abnormal, the intervals at which the second vibration signals have predetermined values are not regular or the values of the second vibration signals are not periodic, and thus an image, such as the image of FIG. 7, is not generated.

The diagnosis unit 360 according to the embodiment of the present invention diagnoses the rotor shaft 200 by taking into account the above-described image characteristics.

According to the embodiment of the present invention, the calculation unit 320 generates vibration signals at omni-directional points, i.e., generates vibration signals at not only points at which signals are measured but also other points based on the measured signals, and thus more accurate diagnosis may be made. Furthermore, the diagnosis unit 360 diagnoses the rotor shaft 200 based on an image generated by the image generation unit 330, and thus the diagnosis may be intuitive.

Next, a method of diagnosing a rotor shaft 200 according to an embodiment of the present invention is described with reference to FIG. 11.

Figure 11:
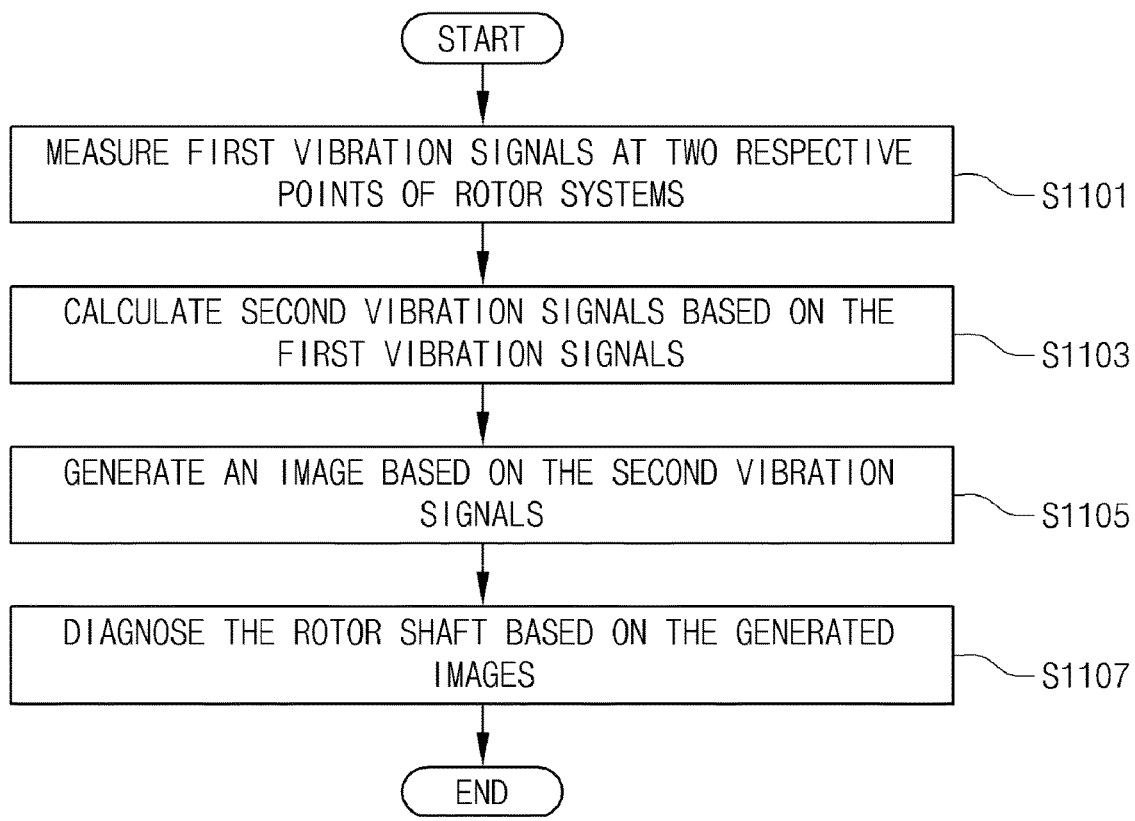
FIG. 11 is a flowchart showing a method of diagnosing rotor shaft according to an embodiment of the present invention.

FIG. 11 is a flowchart showing the method of diagnosing rotor shaft 200 according to the embodiment of the present invention.

The method of diagnosing a rotor shaft 200 according to the embodiment shown in FIG. 11 includes steps that are performed sequentially by the apparatus shown in FIG. 1. Accordingly, although details are omitted in the following description, the details described in conjunction with the apparatus shown in FIG. 1 above may be also applied to the method of diagnosing a rotor shaft 200 according to the embodiment shown in FIG. 11.

The apparatus 300 for diagnosing a rotor shaft 200 according to the embodiment of the present invention measures first vibration signals at two respective points of the rotor shaft 200 located on a surface perpendicular to an axis of rotation at step S1101.

According to the embodiment of the present invention, the apparatus 300 for diagnosing a rotor shaft 200 may measure first vibration signals at two points located on a surface perpendicular to the axis of rotation. Furthermore, these two points may be spaced apart from each other perpendicularly around the axis of rotation. That is, the angle that a first point at which a first vibration signal is measured and a second point, i.e., the other point at which the other first vibration signal is measured, form with respect to the axis of rotation may be a right angle.

The apparatus 300 for diagnosing a rotor shaft 200 according to the embodiment of the present invention generates second vibration signals based on the first vibration signals at step S1103.

The apparatus 300 for diagnosing a rotor shaft 200 according to the embodiment of the present invention may be located in a plane identical to the plane of the first and second points, and may generate second vibration signals based on the first vibration signals, i.e., vibration signals at specific points on the rotor shaft 200. In particular, the apparatus 300 for diagnosing a rotor shaft 200 may generate vibration signals at respective points that have been rotated from any one point, at which a first vibration signal has been measured, around the axis of rotation by a predetermined angle of rotation one or more times, as second vibration signals.

The apparatus 300 for diagnosing a rotor shaft 200 according to the embodiment of the present invention generates an image based on the second vibration signals at step S1105.

The apparatus 300 for diagnosing a rotor shaft 200 according to the embodiment of the present invention may generate an image in which time plotted on an axis and the values of second vibration signals at respective points, sequentially generated from any one point at which a first vibration signal is measured, plotted on another axis are associated with each other. Furthermore, the apparatus 300 for diagnosing a rotor shaft 200 may generate an image in which brightness varies in proportion to the value of a corresponding second vibration signal. For example, the apparatus 300 for diagnosing a rotor shaft 200 may generate an image in which the brightness of a corresponding pair of coordinates is higher when the value of a corresponding second vibration signal value is larger and the brightness of a corresponding pair of coordinates is lower when the value of a corresponding second vibration signal is smaller. Alternatively, the apparatus 300 for diagnosing a rotor shaft 200 may generate an image in which the brightness of a corresponding pair of coordinates is higher when the value of a corresponding second vibration signal value is smaller and the brightness of a corresponding pair of coordinates is lower when the value of a corresponding second vibration signal is larger.

The apparatus 300 for diagnosing a rotor shaft 200 according to the embodiment of the present invention diagnoses the rotor shaft 200 based on the generated image at step S1107.

The apparatus 300 for diagnosing a rotor shaft 200 may diagnose the state of a rotor shaft 200 as an abnormal state if the preset and stored reference image and the generated image are determined to have different shapes by comparing them.

Furthermore, the apparatus 300 for diagnosing a rotor shaft 200 may diagnose whether the state of a rotor shaft 200 is abnormal based on whether the generated image includes oblique lines or based on the shapes of oblique lines.

According to some embodiments of the present invention, an apparatus and method for diagnosing a rotor shaft 200 are provided.

According to some embodiments of the present invention, rotor shaft 200 can be diagnosed based on an image, and notification of the state of the rotor shaft 200 can be intuitively provided to a user.

According to some embodiments of the present invention, rotor shaft 200 can be diagnosed based on omnidirectional vibration signals, and a directional failure can be diagnosed.

The above-described detailed description of the present invention is merely illustrative, and it will be understood by those having ordinary knowledge in the art to which the present invention pertains that modifications and variations can be easily made without departing from the technical spirit and essential features of the present invention. Therefore, it should be appreciated that the above-described embodiments are illustrative in all aspects but are not limitative. For example, each component that is described as being in a single form may be practiced in a distributed form. In the same manner, components that are described as being in a distributed form may be practiced in an integrated form.

The scope of the present invention is defined by the attached claims, rather than the detailed description. Furthermore, all modifications and variations derived from the meanings, scope and equivalents of the claims should be construed as falling within the scope of the present invention.

What is claimed is:

1. A method of diagnosing a rotor shaft, installed in a bearing so that the rotor shaft is rotated around an axis of rotation, using an apparatus for diagnosing a rotor shaft, the method comprising:
   measuring first vibration signals at two points of the rotor shaft located on a surface perpendicular to the axis of rotation;
   calculating second vibration signals, which are vibration signals at points located in a plane including the two points of the rotor shaft at which the first vibration signals are measured, based on the first vibration signals;
   generating an image based on the second vibration signals; and
   diagnosing the rotor shaft based on the generated image,
   wherein calculating the second vibration signals comprises
   calculating vibration signals at points that have been rotated from any one point, at which a corresponding one of the first vibration signals is measured, around the axis of rotation by a predetermined angle of rotation one or more times, as the second vibration signals,
   generating the second vibration signals only at points within a range corresponding to a semicircle of a surface perpendicular to the axis of rotational, and
   inferring such that the second vibration signals within the range corresponding to the remaining semicircle, except for the semicircle, have opposite phases of the same size compared to signals at symmetrical points with respect to the center of an axis.

2. The method of claim 1, wherein:
   measuring the first vibration signals further comprises measuring the first vibration signals at two respective points that are spaced apart from each other perpendicularly around the axis of rotation.

3. The method of claim 1, wherein generating the image comprises generating an image in which time plotted on an axis and values of the second vibration signals at respective points, sequentially generated from any one point at which a corresponding one of the first vibration signals is measured, plotted on another axis are associated with each other and brightness varies in proportion to a value of a corresponding one of the second vibration signals.

4. The method of claim 1, further comprising classifying generated test images according to similarity based on test signals and selecting a representative image for each state from among the classified test images;
   wherein diagnosing the rotor shaft comprises diagnosing a state of the rotor shaft by determining similarity between the image generated by the image generation unit and the representative image for each state.

5. The method of claim 2, wherein calculating the second vibration signals comprises calculating the second vibration signals based on an equation below:

$$x_n = \cos(n\Delta\theta)x_0 - \sin(n\Delta\theta)y_0 (n=1,2,\ldots,N)$$

where $\Delta\theta$ is the angle of rotation, $x_0$ and $y_0$ are the first vibration signals, and $x_0$ is a second vibration signal at a point that has been rotated from $x_0$ by $\Delta\theta$ n times.

6. The method of claim 3, wherein diagnosing the rotor shaft comprises diagnosing the rotor shaft based on oblique lines that are represented in the image due to differences in brightness.

7. The method of claim 3, wherein diagnosing the rotor shaft comprises diagnosing a state of the rotor shaft as an abnormal state if the generated image is different from a preset reference image.

8. The method of claim 6, wherein diagnosing the rotor shaft comprises diagnosing the rotor shaft based on whether there are the oblique lines or based on shapes of the oblique lines.

* * * * *